Feb. 27, 1973   J. JOAQUIN   3,718,481
FISH FILLET PRODUCT AND METHOD FOR MAKING
Filed March 6, 1968
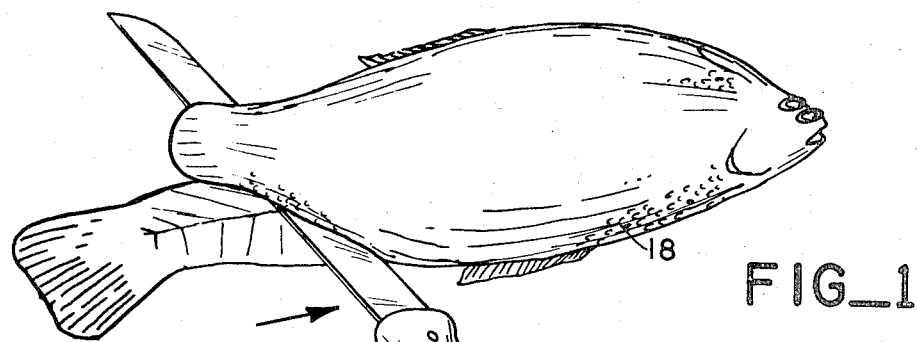
FIG_1
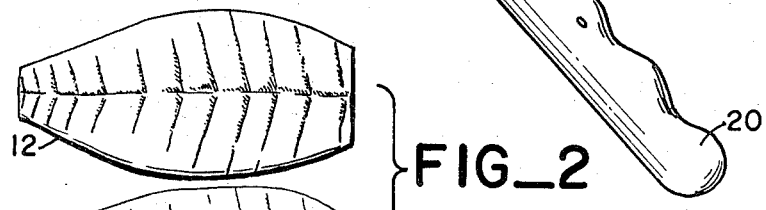
FIG_2
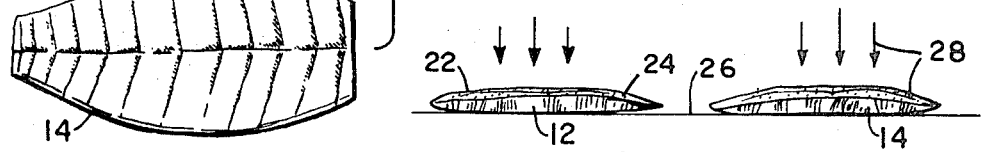
FIG_3
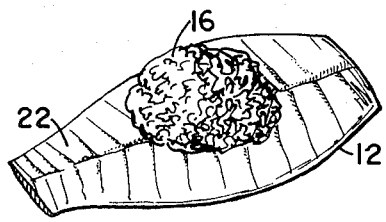
FIG_4
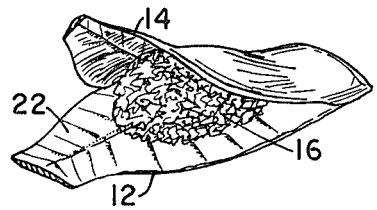
FIG_5
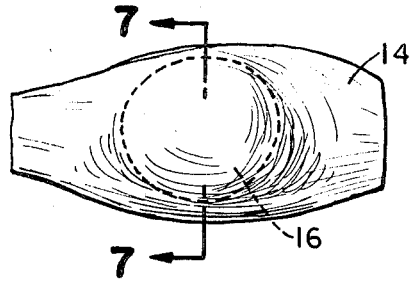
FIG_6
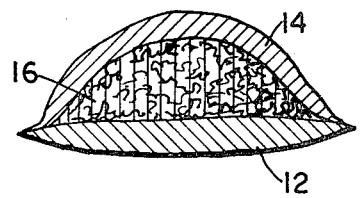
FIG_7
INVENTOR.
JEAN JOAQUIN
BY
Owen, Wickersham & Erickson
ATTORNEYS United States Patent Office 3,718,481
Patented Feb. 27, 1973

3,718,481
FISH FILLET PRODUCT AND METHOD
FOR MAKING
Jean Joaquin, Fairfax, Calif.
(2 Niven Way, Larkspur, Calif. 94939)
Filed Mar. 6, 1968, Ser. No. 710,834
Int. Cl. A23l 1/325
U.S. Cl. 99—111                                    11 Claims

ABSTRACT OF THE DISCLOSURE

A ready-to-cook seafood product comprised of a pair of fish fillets forming an enclosure for a stuffing material which remains substantially sealed to prevent loss of moisture and flavor juices even during the subsequent cooking of the product prior to eating. The method for making the product, which can be stored in a frozen state until ready for use, comprises the steps of filleting a flat type fish to provide two boneless fillets of approximately the same size, depositing a chilled edible stuffing material on one fillet, placing the other fillet over the stuffing material and folding it downwardly into contact with the first fillet and forming a peripheral edge seal between the two fillets forming an enclosure for the stuffing material.

---

This invention relates to an improved ready-to-cook food product utilizing raw fish, and it also relates to a method for making such a product.

In the fish industry it has long been a problem to find ways to utilize various types of fish which are plentiful and nutritious but heretofore too small or not sufficiently taste-worthy in their natural form to create a significant market demand.

A general object of the present invention is directed toward a solution of this problem. More specifically, an object of the present invention is to provide a ready-to-cook fish product that can be made from a wide variety of "flat" type fish that can be stored in a frozen form after being assembled, and that can be easily prepared as a tasteful, satisfying and nutritious form for the consumer merely by heating the product to a predetermined temperature range sufficient to cook it properly.

Another object of my invention is to provide a product that utilizes a relatively small size of flat type fish heretofore difficult to market in combination with any one or more of a wide variety of other edible materials that may include vegetables and other meat or seafood constituents.

Another object of my invention provides a method that is particularly adapted for ease and economy of manufacture even when applied at a high unit production rate.

Still another object of the present invention is to provide a ready-to-cook seafood product comprised of a pair of fish fillets which are sealed together along their adjoining edges to form an enclosed package that retains the juices and flavor of a stuffing material between the fillets during storage of the product and also throughout its cooking process.

Yet another object of my inventinon is to provide a method for making a ready-to-cook seafood product that combines a pair of boneless fillets of a flat type fish to form an enclosure for a stuffing material and which will maintain the stuffing within the enclosure when first put together, thereafter in cold storage, and also throughout the cooking process, so that the fillet package retains the stuffing juices with the enclosure until the product is ready to eat. This is accomplished in my method by the unique manner in which the two fillets are joined together at their edges to form a sealed enclosure for holding a stuffing material not only during storage but even during the cooking period of the product.

Other objects, advantages and features of my invention will become apparent from the following detailed description presented in conjunction with the accompanying drawings wherein:

FIG. 1 is a view in perspective showing the removal of fillets from a fish that are used in making my product;

FIG. 2 is a plan view of the fish fillets removed by the procedure of FIG. 1 for use in making my product;

FIG. 3 is a view in section of the fillets of FIG. 2;

FIG. 4 is a view in perspective showing the addition of stuffing material to one fillet according to the method of my invention;

FIG. 5 is a view in perspective showing the next step in my method for making a seafood product which entails the application of the second to the first fillet portion;

FIG. 6 is a view in perspective of a completed seafood product according to the present invention;

FIG. 7 is a view in cross section taken along line 7—7 of the finished product in FIG. 6.

Referring to the drawing, FIGS. 6 and 7 show a completed fish product 10 embodying the principles of my invention which, in broad terms, comprises a pair of relatively wide but thin pieces of raw fish 12 and 14 which are joined together at or near their edges to form an enclosure that retains a quantity of edible stuffing material 16 between the fish pieces both during storage and subsequently during the cooking process. Thus, the product is one which can be assembled economically, then can be frozen and stored for extended periods until ready for use. Yet, during these periods none of the flavor-producing juices of the stuffing material or the fillets themselves are allowed to escape from the enclosure.

The first step of my method for making the product 10 involves the filleting of a "flat" type fish in the conventional manner. Such fish which are harvested in large quantities by commercial fisheries may include sole, sea perch, flounder and other such species which typically have a much greater width than thickness. It should be understood, however, that my method is not limited to the use of any particular fish species but requires only that a pair of fish fillets be provided that generally have a much greater width than thickness. In filleting such a fish 18, as shown in FIG. 1, a knife 20 may be used to first cut the side of fillets of the unskinned fish starting near the tail and running close to the backbone toward the head of the fish. The skins of the fillets 12 and 14 are then removed by the knife so that each fillet is then skinless and boneless, as shown in FIG. 2.

In any fish fillet that is cut from a raw fish and skinned in the aforesaid manner, the characteristics of the flesh varies through the fillet cross section. As shown in FIG. 3, the side 22 of each fillet from which the skin was removed has a layer 24 of flesh with a slightly more fibrous or muscular composition which enables the fish to curve or bend in both directions as it swims. In the present invention I have discovered a way of utilizing this structural characteristic, and in the next step of the method, both of the fillets are laid flat on a plane surface 26 with their skinned sides 24 facing up. At this point, I prefer to sprinkle a thin layer of flour 28 on the upturned surface of each fillet.

In the next step of my method, a quantity of what I call the stuffing material 16 is placed on the upper skinned side 24 of the first fillet 12, as shown in FIG. 4. Different ingredients for stuffing material may be used including various types of edible vegetables, meat or seafood materials or combinations thereof. For example, I have found that curried rice, spinach, artichokes, celery and asparagus are high satisfactory. Also more complicated mixtures of crabmeat, shrimp or lobster tails may be mixed with a suitable vegetable in any desired combination. The stuffing may be prepared raw or it may be precooked, and it is preferably spiced or seasoned to provide the desired flavor. A prime requirement for the stuffing is that it must have the proper consistency so that it does not liquefy to any great extent or fall apart during subsequent steps of the method or during the storage or cooking of the product. This consistency problem is overcome in part by the careful selection of type and amount of ingredients in the stuffing and also by reducing the temperature of the stuffing to near or below freezing (e.g., 35–40° F.), just before it is applied to the first fillet. Thus, a portion of stuffing 16, when placed on the first fillet 12, will generally hold its shape without slumping and falling off of it.

In the next step of my method, shown in FIG. 5, the second fillet 14 is placed with its skinned side 22 down on top of the portion of stuffing 16. This fillet thus drapes over the stuffing, and its outer edge portions are arranged to extend down and engage the similar edge portions of the first fillet. The flour 28 that was previously applied to the fillet surfaces and which has become moistened by the fillet now serves as a glutinous material to help provide a seal between the two fillets, and thereby forming an enclosure between them containing the stuffing material.

The two fillets have thus formed an elongated, sealed package 10 for the stuffing 16 whose exterior surface, if desired, can be coated with such well-known surface agents as flour, bread, or cracker crumbs.

The fillet package at this point can be prepared immediately for cooking by placing it in a broiling oven pan for a preselected time and temperature. However, the package is particularly adaptable for cold storage where it may be frozen and kept in this condition for long periods until ready for use. The preferred cooking procedure is broiling, and this may be accomplished by placing the fillet package in an oven (e.g., 350°–400° F.) for 20 to 30 minutes.

During storage and particularly when the package is cooked, several important reactions occur. The fillets when subjected to the cooking heat tend to warp considerably, that is, the skinned sides 24 of each fillet tend to become concave. However, since the fillets are assembled with their skinned sides against the stuffing 16, the natural warping only tends to force their sealed edges closer together. Hence, during the entire cooking process the product stays together as a unit, and the juices and flavor of the stuffing are kept inside the fillets.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A method of making a seafood product comprising the steps of:
  filleting a flat type fish to provide first and second boneless skinned fillets of substantially the same size;
  placing a first fillet on a supporting surface with its skinned side up;
  depositing a quantity of stuffing material on said fillet; and
  placing the second fillet with its skinned side downwardly on said stuffing and folding its sides downwardly to engage the edges of the lower first fillet around the stuffing thereby forming a fillet enclosure for the stuffing whereby when the product is cooked the fillets warp to become concave and press the edges together to form a seal for retaining the juices and flavor of the stuffing.

2. The method as described in claim 1 including the step of applying a thin layer of flour to the skinned sides of both fillets before the edges are engaged, whereby said flour layer provides a glutinous material for forming a seal between the two fillets.

3. The method as described in claim 1 including the step of chilling the stuffing material to a temperature below 40° F. before placing it on said first fillet.

4. The method as described in claim 1 including the step of depositing a layer of breading material on the outer surface of the fillets after they have been joined together.

5. The method as described in claim 1 including the step of freezing the product to a rigid condition until ready for cooking.

6. The method as described in claim 1 including the step of broiling the product in an oven at 350°–400° F. for from 20 to 30 minutes.

7. A ready-to-cook seafood product comprising a pair of skinned fish fillets positioned with their skinned sides in face to face relation and against a stuffing, a quantity of edible stuffing material disposed between the skinned side of said fillets, said fillets being joined together along their edge portions which engage to form a seal surrounding the stuffing material which retains the juices thereof within an enclosure formed by the seal, whereby said fillets tend to warp during cooking and cause their engaged edge portions to press together and retain said seal.

8. The product as described in claim 7 including flour on said edge portions forming a glutinous material for retaining said seal.

9. The product as described in claim 7 wherein said stuffing material comprises a vegetable from the group including spinach, celery, fennel, artichokes or asparagus.

10. The product as described in claim 7 wherein said stuffing material comprises a mixture including pieces of shellfish from the group including crab, lobster or shrimps.

11. The product as described in claim 7 being in a frozen state.

References Cited
UNITED STATES PATENTS 1,174,635   3/1916   Stafford _____ 99—111

OTHER REFERENCES

"Our Favorite Meats," 1966, pp. 175, 179, 180, 204, Favorite Recipes Press, Inc., Montgomery, Ala.

Lord: "Everybody's Cookbook," Harcourt, Brace and Company, New York, 1937, p. 351.

RAYMOND N. JONES, Primary Examiner

R. M. ELLIOTT, Assistant Examiner

U.S. Cl. X.R.

99—195